July 27, 1954 H. J. SCHOELLES 2,684,620
AUTOMOBILE HEATING SYSTEM
Filed Nov. 8, 1950 2 Sheets-Sheet 1

Inventor
Harold J. Schoelles
By Willits, Helmig & Baillio
Attorneys

July 27, 1954    H. J. SCHOELLES    2,684,620
AUTOMOBILE HEATING SYSTEM
Filed Nov. 8, 1950    2 Sheets-Sheet 2
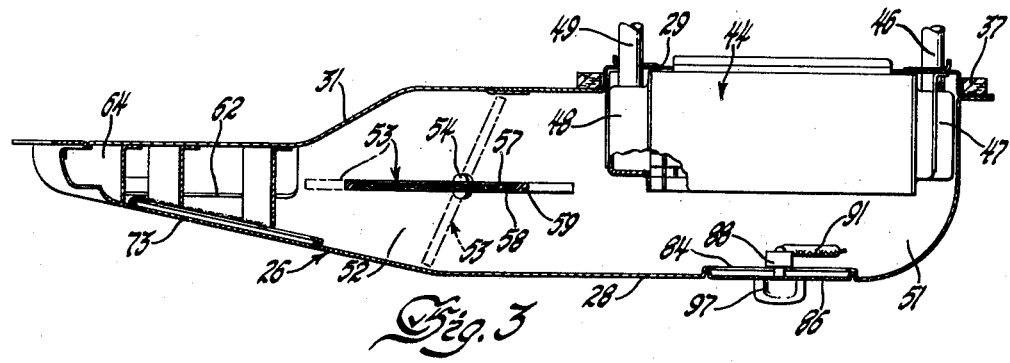
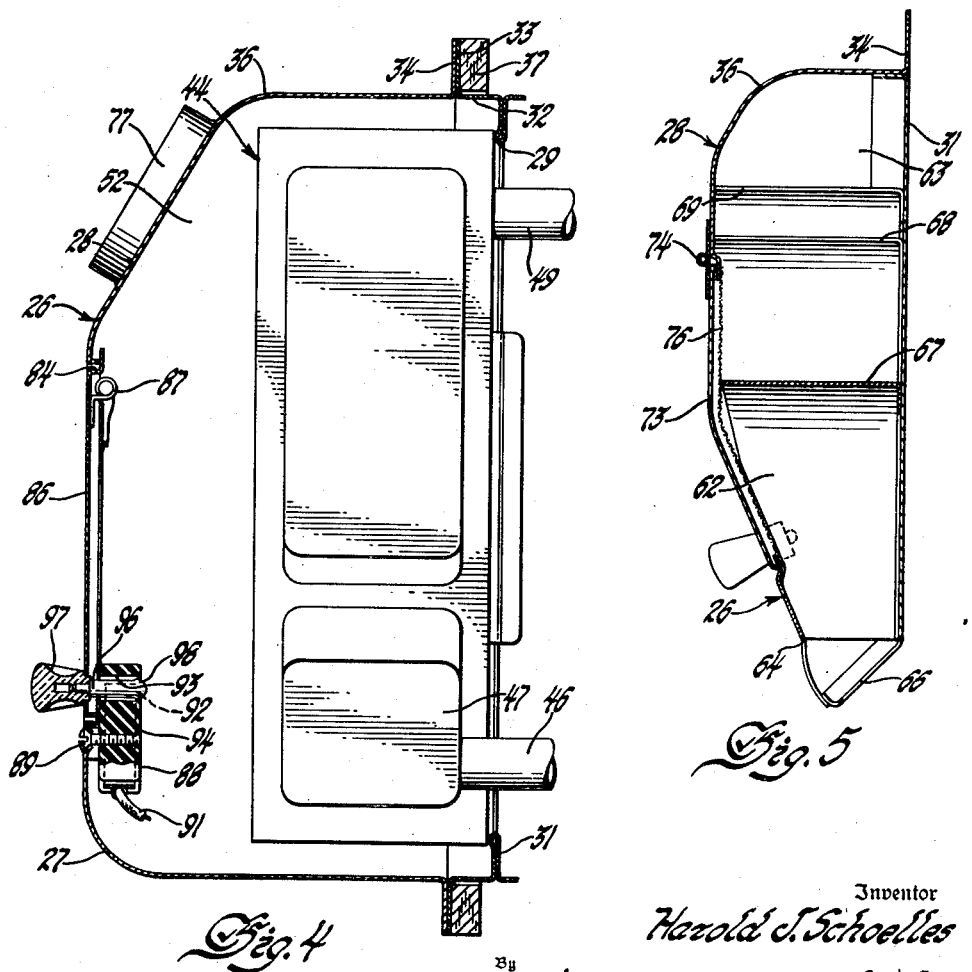
Inventor
Harold J. Schoelles
By Willits, Helmig & Baillio
Attorneys

Patented July 27, 1954

2,684,620

UNITED STATES PATENT OFFICE 2,684,620

AUTOMOBILE HEATING SYSTEM

Harold J. Schoelles, Lockport, N. Y., assignor to General Motors Corporation, Detroit, Mich., a corporation of Delaware Application November 8, 1950, Serial No. 194,647

12 Claims. (Cl. 98—2)

This invention relates to heating systems for automobiles and has particular relation to fresh air heating systems which can be employed in winter for heating both the upper and lower regions within the interior of an automobile and for defrosting the windows of an automobile and which also can be employed in summer for introducing fresh cool air into the interior of an automobile for cooling and ventilation purposes.

An object of the invention is to provide a simple, economical and efficient fresh air heating system for automobiles, in which a single heating element and motor driven blower can be employed for both heating and defrosting purposes.

Another object of the invention is to provide a heating system for such dual purposes, in which the heating element for the system can be placed on the side of the automobile opposite the driver's seat where the air will be heated in such region and then will be distributed through a jet-type outlet located adjacent the central and lower part of the front of the automobile, and through openings leading to the windshield and to the upper regions within the interior of the automobile or through one of such outlets.

Another object of the invention is to provide a novel valve or baffle member for deflecting the air heated by the heating element for the system entirely to the windows and upper regions of the body of the automobile for heating, defogging, defrosting or deicing purposes or for discharging the heated air into both the lower and upper regions within the body of the automobile for both heating and other purposes.

Another object of the invention is to provide a heater closure member that can be opened in summer for allowing fresh air from outside to enter the automobile body through the heater, that can be closed in winter for increasing the static pressure within the heater for propelling a blast of air from the heater for distribution throughout the interior of the automobile body, that will cause an electrical circuit to be closed so that the heater motor may be operated when the closure is closed, and that will open such circuit when the closure is moved away from its closed position.

Another object of the invention is to provide a combined detent mechanism and switch for resiliently holding the heater closure member in closed position and for simultaneously closing an electrical circuit for operating the heater motor.

The invention comprises a casing in which a slight static pressure is maintained at all times during the operation of the heater. This pressure is maintained by providing restricted outlets from the casing for discharging jets of air into the interior of the automobile for properly distributing the air throughout all portions of the interior of the automobile. One of these jets of air is adapted to be discharged downwardly and rearwardly at approximately a 45° angle and upon a raised portion of the floor which is formed in the floor above the flywheel and transmission housing for the driving mechanism of the automobile. When this jet of air is discharged upon the upwardly sloping part of such raised portion of the floor which is formed at the front of the floor, the air spreads out over all the floor, flows beneath the front seat of the automobile, and into the rear part of the automobile for heating the entire lower part of the body thereof. Other jets are formed around the lower edge of the windshield or windows of the automobile, these jets being supplied with heated air by a manifold which in turn is connected to the heater casing. These jets also distribute the air throughout the upper portion of the automobile by discharging high velocity blasts of air against the windshield. These blasts of air are turned rearwardly at the upper part of the windshield by the roof of the automobile and thereafter flow into the entire upper part of the automobile body. A valve is provided in the casing between the passages leading to these upper and lower jets and this valve may be manipulated in such a way as to divide the air from the heater in the desired proportions.

A door is also provided in the casing immediately in front of the heating element for the casing, and when this door is opened, the static pressure in the heater casing is practically destroyed. The opening of this door allows fresh air to flow from the outside into the automobile body for summer cooling and ventilation purposes. In order to prevent injury to the motor by the reduction of the static pressure in the casing and against which the motor for operating the heater blower is designed to operate, means is provided for opening a circuit through the motor for stopping the motor when the door referred to is opened. Under such circumstances the car will be ventilated by the motion of the car which will provide a ram effect sufficient to cause air to flow inwardly from in front of the automobile, into the casing and thence into the body through the opening in the casing referred to.

In the drawings:

Figure 3 is a horizontal sectional view through the automobile heater structure illustrated by Figure 2. Figure 3 is taken substantially in the plane of line 3—3 of Figure 2 looking in the direction of the arrows thereon.

Figure 4 is a vertical sectional view of the structure illustrated by Figure 2, taken substantially in the plane of line 4—4 on Figure 2 and looking in the direction of the arrows thereon.

Figure 5 is another vertical sectional view of the structure illustrated by Figure 2. Figure 5 is taken in the plane of line 5—5 on Figure 2, looking in the direction of the arrows thereon.

Figure 1:
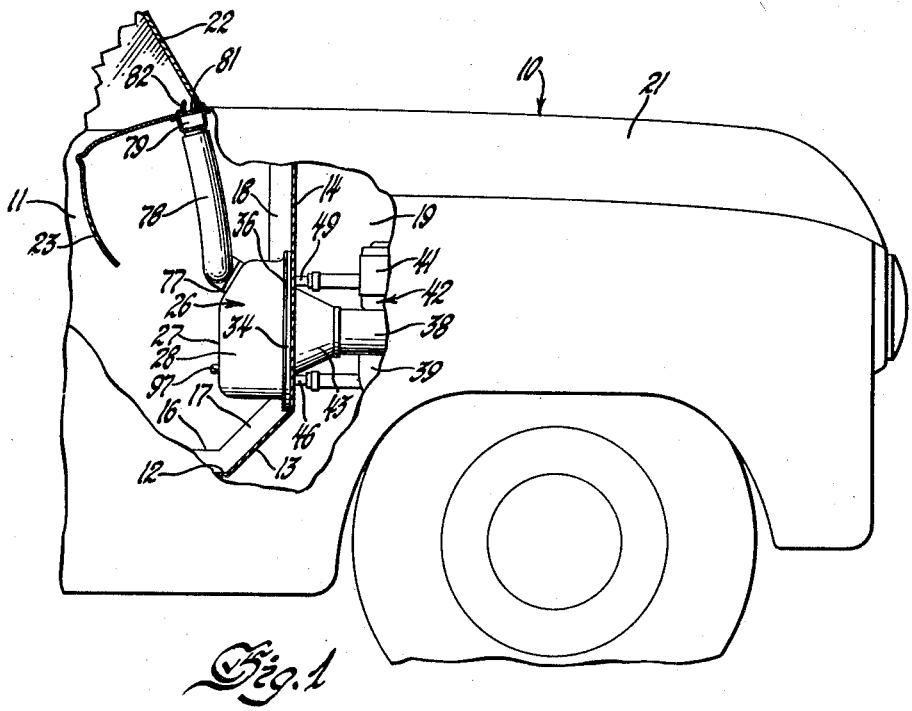
Figure 1 is a fragmentary side elevational view of the front end of an automobile with parts thereof broken away to better illustrate the installation of the automobile heating system embracing the principles of the invention.

In Figure 1, the front end of an automobile is generally indicated by the numeral 10. The automobile 10 comprises a body 11 having a floor 12 with a front end portion thereof sloping upwardly at 13 and joined to the lower edge of a partition or fire wall 14 separating the engine compartment from the interior of the body 11. The central part of the floor 12 has a horizontally disposed, raised portion 16 and an upwardly sloping raised portion 17 at the front thereof for the purpose of providing room for accommodating the transmission and clutch and flywheel housings of the automobile extending beneath the floor 12. The fire wall 14 also is deflected rearwardly as is indicated at 18 to provide a continuation of the raised portions 16 and 17 throughout the vertical extent of the wall 14. The automobile is provided with an engine compartment 19 which is covered by a cowling 21, the front end of which is adapted to house the engine cooling system radiator to which air is admitted through grille-covered openings formed in the front end of the engine cowling 21. The front of the body 11 is formed by the windshield 22 and an instrument panel 23 extends across the front of the body 11 behind and beneath the windshield 22.

The automobile heating system 26 comprises a heater and distributor 27 which is formed by a casing 28 secured to and supported by the fire wall 14 in any suitable manner. The casing 28 is formed to provide an opening 29 in the rear wall 31 thereof and at one side of the rear wall so that the opening 29 will communicate with one end of the casing 28. The rear wall 31 of the casing 28 is pressed and flanged forwardly of the casing around the opening 29, as indicated at 32, for the purpose of projecting into an opening in the fire wall 14 with which the opening 29 is adapted to communicate. The rear wall 31 is also flanged outwardly of flanged portion 32 as is indicated at 33 for the purpose of providing means for securing by welding or otherwise the rear wall of said casing to the flanged edge 34 of the front wall 36 of said casing 28. Surrounding the outwardly depressed part 32 of the casing 28 is a wood frame 37 adapted to engage the wall 14 when the heater and distributor 27 is installed.

The casing 28 is adapted to be supplied with air from the front end of the automobile by an air conduit indicated at 38. The front end of the air conduit is disposed at one side of the radiator of the automobile so as to receive fresh unheated air from outside the automobile. The conduit 38 has a blower 39 connected therein, the blower 39 being driven by a motor 41 which is connected to the blower in such manner as to provide a motor blower unit that may be secured to the fender or other part of the automobile 10 and in any desired location within the engine compartment 19. The rear end of the conduit 38 is connected to the opening 29 by a coupling member 43 which is secured to the fire wall 14 around the opening in the fire wall with which the opening 29 communicates.

It will be apparent that when the motor blower unit 42 is operating, fresh air from outside the automobile will be supplied to the interior of the casing 28 through the opening 29 by the blower 39 and by the conduit 38 and coupling 43.

Inside the casing 28 and directly opposite the opening 29 is any suitable cellular or fin and tube radiator or core which provides a heating element 44 for heating the air supplied to the casing 28 through the opening 29. The heating element 44 is supplied with hot water from the cooling system of the engine of the automobile 10 by a supply conduit 46 which communicates with a header 47 formed at one end of the heating element. The water supplied to the header 47 passes through the heating element 44 through transverse passages formed therein and is collected at the opposite end of the heating element in a header 48. The water is exhausted from the header 48 and returned to the cooling system of the engine through a conduit 49. The flow of water through the heating element may be controlled in any suitable manner as by the employment of a manually or thermostatically operated valve for controlling the admission of fluid to the heating element through the conduit 46.

As will be apparent from Figure 3, the width of the heating element 44 from front to rear thereof is considerably less than the front to rear width of the end of the casing 28 in which the heating element is located. Such difference in width provides a receiving chamber 51 within the casing 28 which is located in front of the heating element 44 and at one side thereof in the casing 28. The receiving chamber 51 communicates at one end thereof with a distribution chamber 52 which is formed within the casing 28 at one side of the heating element 44. The distribution chamber 52 is provided with a valve or baffle 53 mounted on a shaft 54 which is pivotally secured in bearings formed in the upper and lower walls of the casing 28. The upper end of the shaft 54 projects through the casing 28 and is there formed to provide a crank indicated at 56, which may be employed in operating the baffle or valve 53. Crank 56 may be operated in any suitable manner by a Bowden wire, a rod, or other suitable means, and the operating end of which may be secured in a fixture or fitting mounted upon or beneath the instrument panel 23 of the automobile. The valve 53 is constructed of two sheets of metal 57 and 58 which are adapted to be formed around the shaft 54 and to be separated at the edges thereof to provide continuing grooves in which a flexible rubber gasket 59 is adapted to be secured. The gasket 59 projects outwardly from the metal sheets 57 and 58 in such manner as to engage the walls of the casing 28 when the valve is closed within the distribution chamber 52. The valve 53 is mounted in the distribution chamber 52 in such a way that the upper end thereof is inclined away from the heating element 44 to provide an upwardly tapering passage within the casing 28 and between the valve and the adjacent end of the heating element 44. In order to provide a continuation for the slope of the valve 53 and to provide a restricted outlet from the casing beyond the valve 53, the lower wall of the casing 28 is curved inwardly and upwardly as is indicated at 62. The slope of the lower part of the inwardly sloping wall 61 provides a continuation of the slope of the valve 53 when the valve is closed within the distribution passage 52. Beyond the valve 53, the side walls of the casing 28 are inclined inwardly to provide a discharge passage 62 having a considerably reduced cross-sectional area relative to the cross-sectional area of the distribution passage 52. The upper wall of the casing 28 is curved downwardly at 63 adjacent the discharge passage 62 and meets the lower wall of the casing at the adjacent end thereof. The bottom wall of the casing 28 is cut out in such a way as to provide an opening indicated at 64 through which a jet or blast of air is discharged forwardly and downwardly from the discharge passage or compartment 62. The jet or blast of air from the opening 64 is discharged against the upper middle portion of the raised and inclined portion 17 of the sloping part 13 of the floor 12 and the opening 64 is formed in such a way that the blast or jet of air may be discharged downwardly and rearwardly in this manner. The lower part of the back wall 31 is bent forwardly at 66 to aid in directing the jet or blast of air discharged from opening 64 in the manner described.

The space within the discharge compartment 62 is intersected by a plurality of arcuate vanes indicated at 67, 68, and 69 for the purpose of properly directing and distributing the air from the distribution compartment 52 through the discharge compartment 62 and from the opening 64. The vane 69 is bent at the lower end thereof toward the outside curved wall 63 of the casing 28 so as to deflect some of the air from the casing through an opening 71 which is formed at the end of the casing. The air discharged through the opening 71 will heat the interior of the automobile in the vicinity of the driver's feet. Also connected to the casing 28 and to the space between the vane 69 and the curved wall 63 is a conduit 72 which is connected at the opposite end thereof to a casing which may be employed for housing a thermostatically actuated water valve for controlling the circulation of hot water to the heating element 44.

The casing 28 at the front of the discharge compartment 62 is formed in such a way as to provide an opening normally adapted to be closed by a door or closure 73. The door 73 is hinged at the top as is indicated at 74 and the opening which is normally closed by the door 73 is covered by a screen indicated at 76. The door 73 can be opened for the purpose of letting more air out of the casing 28 and into the front part of the automobile, whereas the air discharged from the opening 64 will tend to flow to a greater extent under the front seat of the automobile for heating the rear seat compartment of the automobile. However, since the opening closed by the door 73 is formed in the relatively constricted part of the casing which forms the discharge compartment 62, it will be apparent that the static pressure within the interior of the casing which is caused by the discharge of air into the casing by the blower 39, will not be materially reduced.

The casing 28 also is formed in such a way as to provide a second outlet passage which is indicated by the numeral 77. The outlet passage 77 is formed in the top and at the front side of the casing 28 and between the upper extremities of the valve 53 and the heating element 44. The opening 77 is connected by an air conduit 78 to an air distribution manifold 79 which is secured within the instrument panel 23 and at the front edge thereof, just below the lower edge of the windshield 22. The instrument panel 23 is formed in such a way as to provide a plurality of outlet passages therethrough which lead from the interior of the distribution manifold 79 to the inside of the automobile body just behind the windshield 22. A molding 82 is employed adjacent the outlet passages 81 for the purpose of directing the air from the passages 81 into contact with the rear surface of the windshield 22.

When the valve 53 is in the open position of the valve, it will be apparent that the air heated by the heating element 44 will be discharged to both the upper and lower parts of the automobile through the outlet passage 64 and the outlet passages 81. However, when the valve 53 is closed, the flow of air from the interior of the casing will be cut off from the opening 64 and all of the air from the heating element 44 will be discharged through the outlet passages 81, against the interior surface of the windshield 22 and into the upper regions within the automobile body.

Figure 2:
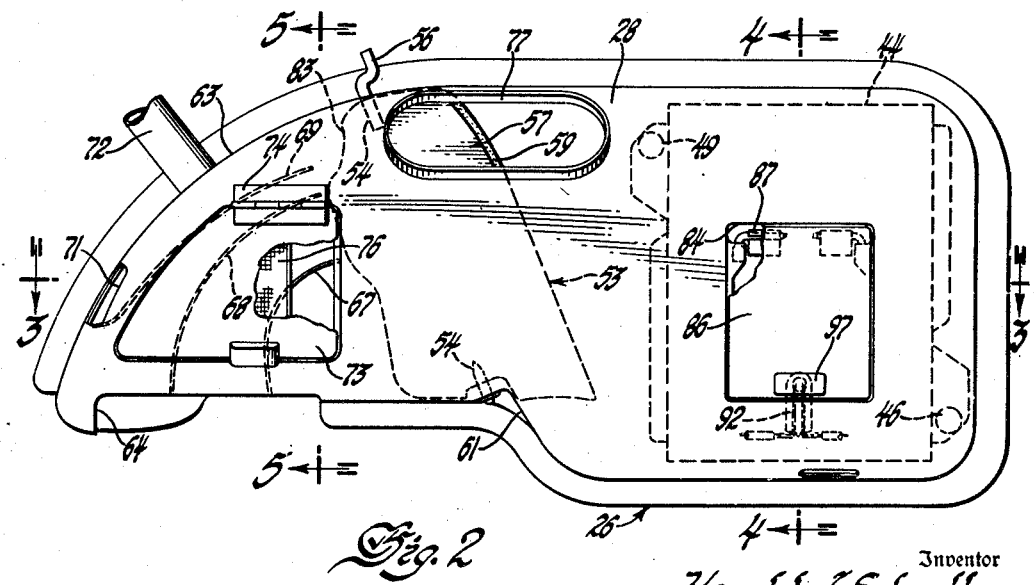
Figure 2 is an elevational view of the automobile heater casing, looking at the side of the casing that may be seen from the interior of an automobile and beneath the instrument panel thereof.

It will be apparent from Figure 2 that the valve 53 is formed in such a way as to provide a notch indicated at 83. The notch 83 is formed in the valve 53 immediately in front of the space between the vane 69 and the outer curved wall 63 of the casing 28. When the valve 53 is in its closed position, a certain amount of air will flow through the notch 83 and will be directed by the vane 69 into the conduit 72. The air so supplied by the notch 83 may be employed for controlling the supply of water to the heating element 44 so that the supply of water may be reduced after the flow of air is continued for a sufficient length of time.

The front wall of the casing 28 is provided with an opening 84 which is formed in the casing directly in front of the outlet side of the heating element 44. The opening 84 is adapted to be closed by a door 86 which is hinged at 87 to the casing 28 along the upper edge of the opening 84. The door 86 is adapted to be closed at all times during the operation of the blower 39 and when the blower 39 is employed for the purpose of supplying air to be heated by the heating element 44. However, when it is desired to ventilate without heating the interior of the automobile, the door 86 may be opened and fresh air may be supplied to the interior of the automobile through the opening 84. However, the opening of the door 86 will tend to decrease the static pressure within the casing 28 when the blower 39 is operating and such decrease in pressure will cause the blower 39 to handle a greater quantity of air than it is designed to handle during the operation of the device as a heating system. Such increase in the amount of air handled by the blower 39 will tend to slow down the motor 41 which will greatly increase the amperage required for operation of the motor 41. Such increase in amperage is likely to be injurious to the motor 41 so that means has been provided for insuring that the motor 41 will not be operated when the door 86 is opened. The door 86 therefore is constructed in such a way as to operate a switch 88 which is secured within the casing 28 by a screw indicated at 89 at the lower extremity of the opening 84. The switch 88 is connected by conductors 91 in series with the motor 41, each of the conductors 91 being connected within the switch 88 to one of a pair of resilient contact members indicated at 92. The upper ends of the contact members 92 are adapted to terminate on each side of a transverse opening 93 which is formed in the insulated body of the switch, indicated by the numeral 94. The opening 93 is adapted to receive a terminal 96 which is connected to the door 86 by an operating member indicated at 97. The end of the terminal 96 is enlarged as is indicated at 98 so that the projection of the enlarged end 98 through and beyond the resilient contacts 92 will tend to hold the door 86 in its closed position. The terminal 96 also will close an electrical circuit between the resilient contact members 92 so that the motor 41 may be operated. However when the operating member 97 is manipulated to open the door 86, the terminal 96 will be withdrawn from between the contact members 92 and while the members will then close to some extent, they will not close enough to form an electrical circuit between the members. When the door 86 is opened in this manner, it will be apparent that the electrical circuit through the motor 41 will be open and it will be impossible to operate and to injure the motor 41.

I claim:

1. A heating system for automobiles comprising a casing having a heating unit therein for heating air within said casing, motor driven means for circulating air through said heating element and for discharging said air within said casing, a closure for said casing, said closure being movably supported by said casing for closing an opening formed in said casing, and switch means associated with said casing and said closure for controlling the operation of said motor driven means, said switch means comprising a pair of open contact members mounted on said casing connected in an electrical circuit for operating the motor of said motor driven means, and means associated with said closure for closing an electrical circuit between said contacts when said closure is in one position with respect to said opening.

2. An automobile heating system comprising a casing having a heating element associated therewith for discharging heated air into said casing, said casing being formed to provide a restricted outlet for discharging a heated air jet within said automobile for heating said automobile, motor driven means for discharging air upon said heating element and within said casing, a motor for driving said means, a second outlet formed in said casing and adapted to release the static pressure formed in said casing when said heated air jet is being discharged from said restricted outlet, a closure for said second outlet, electrical circuit closing means associated with said casing for opening and closing an electrical circuit through said motor, and means associated with said closure for opening the circuit provided by said circuit closing means when said closure is moved away from said second outlet opening.

3. An automobile heating system comprising a casing having a heating element associated therewith for discharging heated air into said casing, an opening formed in said casing in opposed relation to the discharge side of said heating element, a closure for said opening, hinge means for securing one side of said closure to said casing, an electrical contact element carried by the other side of said closure, said contact element being formed to provide an enlarged end, a pair of spaced and resilient electrical contact elements adapted to receive said first mentioned contact element and to be deflected laterally away from one another by the movement of said enlarged end of said first mentioned contact element through and beyond said spaced pair of contact elements, and means for moving said closure upon said hinge means for projecting said enlarged end of said first mentioned contact element through and beyond said pair of contact elements for resiliently securing said closure in closed position and for closing an electrical circuit between said pair of contact elements.

4. A heater adapted for installation on the dash panel of a motor vehicle, comprising, a casing having a front wall, a rear wall spaced from said front wall, top, bottom, and end walls connecting said front and rear walls, said rear wall having an air inlet opening therein near one end of said casing, a heating core mounted on said rear wall in alignment with said inlet opening, said front wall being spaced from said heating core thereby forming a chamber for the air flowing through said heating core, said casing having a discharge opening therein near the other end thereof through which air may discharge downwardly into said vehicle, said casing having a second discharge opening at the upper end thereof between said first mentioned discharge opening and said heating core through which air may discharge upwardly into said vehicle, a valve mounted in said chamber between said discharge openings for apportioning the air entering said chamber between said discharge openings, and the distance between said front and rear walls becoming progressively shorter from said valve to said first mentioned discharge opening, thereby forming a restricted passage leading to said first mentioned discharge opening.

5. A heater adapted for installation on the dash panel of a motor vehicle, comprising, an elongated casing extending transversely of said dash panel and having a front wall, a rear wall spaced from said front wall, top, bottom, and end walls connecting said front and rear walls, said rear wall having an air inlet opening therein near one end of said casing, a heating core mounted on said rear wall adjacent said inlet opening, said front wall being spaced from said heating core thereby forming a chamber for the air flowing through said heating core, said bottom wall having a discharge opening therein near the other end of said casing through which air may discharge downwardly into said vehicle, said front wall having a discharge opening therein near the upper end thereof between said first mentioned discharge opening and said heating core through which air may discharge upwardly into said vehicle, a valve mounted in said chamber between said discharge openings for apportioning the air entering said chamber between said discharge openings, and said front and rear walls converging laterally from said valve, forming a restricted passage leading to said first mentioned discharge opening.

6. A heater adapted for installation on the dash panel of a motor vehicle, comprising, an elongated casing extending transversely of said dash panel and having a front wall, a rear wall spaced from said front wall, top, bottom, and end walls connecting said front and rear walls, said rear wall having an air inlet opening therein near one end of said casing, a heating core mounted on said rear wall adjacent said inlet opening, said front wall being spaced from said heating core thereby forming a chamber for the air flowing through said heating core, said bottom wall having a discharge opening therein near the other end of said casing through which air may discharge downwardly into said vehicle, said front wall having a discharge opening therein near the upper end thereof between said first mentioned discharge opening and said heating core through which air may discharge upwardly into said vehicle, a valve mounted in said chamber between said discharge openings for apportioning the air entering said chamber between said discharge openings, said front and rear walls converging laterally from said valve, forming a restricted passage leading to said first mentioned discharge opening, said front wall having a second discharge opening therein in substantial alignment with said inlet opening through which air may discharge directly into said vehicle, and movable closure means for said last mentioned opening.

7. A heater adapted for installation on the dash panel of a motor vehicle, comprising, an elongated casing extending transversely of said dash panel and having a front wall, a rear wall spaced from said front wall, top, bottom, and end walls connecting said front and rear walls, said rear wall having an air inlet opening therein near one end of said casing, a heating core mounted on said rear wall adjacent said inlet opening, said front wall being spaced from said heating core thereby forming a chamber for the air flowing through said heating core, said bottom wall having a discharge opening therein near the other end of said casing through which air may discharge downwardly into said vehicle, said front wall having a discharge opening therein near the upper end thereof between said first mentioned discharge opening and said heating core through which air may discharge upwardly into said vehicle, a valve mounted in said chamber between said discharge openings for apportioning the air entering said chamber between said discharge openings, said front and rear walls converging laterally from said valve, forming a restricted passage leading to said first mentioned discharge opening, said front wall having a second discharge opening therein in substantial alignment with said inlet opening through which air may discharge directly into said vehicle, movable closure means for said last mentioned opening, a third discharge opening provided in said front wall widely spaced laterally from said last mentioned opening, and movable closure means for said third discharge opening.

8. A heater adapted for installation on the dash panel of a motor vehicle, comprising, an elongated casing extending transversely of said dash panel and having a front wall, a rear wall spaced from said front wall, top, bottom, and end walls connecting said front and rear walls, said rear wall having an air inlet opening therein near one end of said casing, a heating core mounted on said rear wall and extending across said inlet opening, said front wall being spaced from said heating core thereby forming a chamber for the air flowing through said heating core, said bottom wall having a discharge opening therein near the other end thereof through which air may discharge downwardly into said vehicle, the said end wall adjacent said first mentioned discharge opening curving downwardly between said top and bottom walls and having a discharge opening therein, and a plurality of vanes for directing and distributing the air in said casing to said first and third mentioned discharge openings.

9. A heater adapted for installation on the dash panel of a motor vehicle, comprising, an elongated casing extending transversely of said dash panel and having a front wall, a rear wall spaced from said front wall, top, bottom, and end walls connecting said front and rear walls, said rear wall having an air inlet opening therein near one end of said casing, a heating core mounted on said rear wall and extending across said inlet opening, said front wall being spaced from said heating core thereby forming a chamber for the air flowing through said heating core, said bottom wall having a discharge opening therein near the other end thereof through which air may discharge downwardly into said vehicle, the said end wall adjacent said first mentioned discharge opening curving downwardly between said top and bottom walls and having a discharge opening therein, a plurality of vanes for directing and distributing the air in said casing to said first and third mentioned discharge openings, and a valve in said chamber between said vanes and said heating core for controlling the air flow to said discharge openings.

10. A heater adapted for installation on the dash panel of a motor vehicle, comprising, an elongated casing extending transversely of said dash panel and having a relatively wide front wall, a relatively wide rear wall spaced from said front wall, top, bottom, and end walls connecting said front and rear walls, said rear wall having an air inlet opening therein near one end of said casing, a heating core mounted on said rear wall and extending across said inlet opening, said front wall being spaced from said heating core thereby forming a chamber for the air flowing through said heating core, said casing having a discharge opening therein near the other end of said casing through which air may discharge downwardly into said vehicle, said casing having a second discharge opening therein between said first mentioned discharge opening and said heating core through which air may discharge upwardly into said vehicle, a valve mounted in said chamber between said discharge openings for apportioning the air entering said chamber between said discharge openings, the said end wall disposed adjacent said first mentioned discharge opening being arcuate and having a discharge opening therein, said front and rear walls converging from said valve forming a restricted passage leading to said first and third mentioned discharge openings, and a plurality of arcuate vanes in said restricted passage for directing and distributing the air flowing therein to said first and third mentioned discharge openings.

11. A heater adapted for installation on the dash panel of a motor vehicle, comprising, an elongated casing extending transversely of said dash panel and having a relatively wide front wall, a relatively wide rear wall spaced from said front wall, top, bottom, and end walls connecting said front and rear walls, said rear wall having an air inlet opening therein near one end of said casing, a heating core mounted on said rear wall and extending across said inlet opening, said front wall being spaced from said heating core thereby forming a chamber for the air flowing through said heating core, said casing having a discharge opening therein near the other end of said casing through which air may discharge downwardly into said vehicle, said casing having a second discharge opening therein between said first mentioned discharge opening and said heating core through which air may discharge upwardly into said vehicle, a valve mounted in said chamber between said discharge openings for apportioning the air entering said chamber between said discharge openings, the said end wall disposed adjacent said first mentioned discharge opening being arcuate and having a discharge opening therein, said front and rear walls converging from said valve forming a restricted passage leading to said first and third mentioned discharge openings, a plurality of arcuate vanes in said restricted passage for directing and distributing the air flowing therein to said first and third mentioned discharge openings, a discharge opening in said front wall opposite said inlet opening through which air may flow directly into said vehicle, a second opening in said front wall remote from last mentioned opening and a movable closure for said last mentioned opening.

12. A heater adapted for installation on the dash panel of a motor vehicle, comprising, a casing having a relatively wide front wall, a relatively wide rear wall spaced from said front wall, top, bottom, and end walls connecting said front and rear walls, said rear wall having an air inlet opening therein near one end of said casing, a heating core mounted on said rear wall and extending across said inlet opening, said front wall being spaced from said heating core thereby forming a chamber for the air flowing through said heating core, said casing having a discharge opening therein near the other end of said casing through which air may discharge downwardly into said vehicle, said casing having a second discharge opening therein between said first mentioned discharge opening and said heating core through which air may discharge upwardly into said vehicle, a valve mounted in said chamber between said discharge openings for apportioning the air entering said chamber between said discharge openings, the said end wall disposed adjacent said first mentioned discharge opening being arcuate and having a discharge opening therein, said front and rear walls converging from said valve forming a restricted passage leading to said first and third mentioned discharge openings, a plurality of arcuate vanes in said restricted passage for directing and distributing the air flowing therein to said first and third mentioned discharge openings, electric motor driven means for forcing air through said inlet opening, an opening in said front wall opposite said inlet opening through which air may flow directly into said vehicle, a movable closure for said last mentioned opening, switch means for said motor, and means on said closure for closing said switch when said closure is in closed position and for opening said switch when said closure is moved toward open position.

References Cited in the file of this patent

UNITED STATES PATENTS

| Number | Name | Date |
|---|---|---|
| 1,775,654 | Myers | Sept. 16, 1930 |
| 1,988,686 | Jackson | Jan. 22, 1935 |
| 2,249,957 | Holmes | July 22, 1941 |
| 2,306,796 | Staley | Dec. 29, 1942 |
| 2,518,356 | Mieras et al. | Aug. 8, 1950 |
| 2,542,317 | Faulhaber et al. | Feb. 20, 1951 |
| 2,548,034 | Major | Apr. 10, 1951 |